United States Patent [19]
Gras et al.

[11] Patent Number: 5,852,154
[45] Date of Patent: Dec. 22, 1998

[54] COLD-CURING, LOW-SOLVENT OR SOLVENT-FREE 2-COMPONENT POLYURETHANE/POLYUREA COMPOSITIONS

[75] Inventors: Rainer Gras, Bochum; Felix Schmitt, Herten; Elmar Wolf, Recklinghausen, all of Germany

[73] Assignee: Huels Aktiengesellschaft, Marl, Germany

[21] Appl. No.: 749,555

[22] Filed: Nov. 15, 1996

Related U.S. Application Data

[63] Continuation of Ser. No. 318,446, Oct. 5, 1994, abandoned.

[30] Foreign Application Priority Data

Oct. 30, 1993 [DE] Germany .................. 43 37 236.8

[51] Int. Cl.$^6$ .................................. C08G 18/10
[52] U.S. Cl. ................................. 528/61; 528/64
[58] Field of Search ........................ 528/61, 64

[56] References Cited

U.S. PATENT DOCUMENTS

| | | | |
|---|---|---|---|
| 4,892,920 | 1/1990 | Quay et al. | 528/61 |
| 4,925,974 | 5/1990 | Gras | 560/336 |
| 5,312,886 | 5/1994 | Hauce et al. | 528/64 |
| 5,317,076 | 5/1994 | Primeaux | 528/61 |
| 5,548,056 | 8/1996 | Chung | 528/61 |

FOREIGN PATENT DOCUMENTS

| | | |
|---|---|---|
| 0 322 089 | 6/1989 | European Pat. Off. . |
| 0 420 426 | 4/1991 | European Pat. Off. . |

OTHER PUBLICATIONS

G. Oertel; Polyurethane Handbook; New York; 1985; p. 12.

*Primary Examiner*—Rachel Gorr
*Attorney, Agent, or Firm*—Oblon, Spivak, McClelland, Maier & Neustadt, P.C.

[57] ABSTRACT

The invention relates to cold-curing, low-solvent or solvent-free 2-component polyurethane/polyurea compositions comprising a reaction product of:

a) a diamine of the following composition

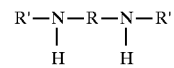

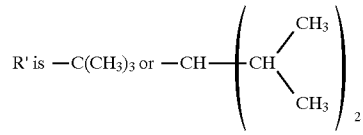

where R is a linear, branched or cyclic alkylene radical having 2–16 carbon atoms which may be optionally substituted by $C_1$–$C_4$ alkyl, wherein in said alkylene radical 1–3 $CH_2$ groups may optionally be replaced by

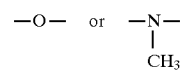

groups; and b) one or more NCO prepolymers prepared from reaction of one or more linear, branched or cyclic aliphatic isocyanates and one or more branched polyetherpolyols or polyesterpolyols, wherein the NCO prepolymer has an NCO functionality $\geq 2$;

wherein reactants a) and b) are reacted in an NCO:NH equivalent ratio of (1.5–1):1 and their use as coatings and reaction coating materials.

4 Claims, No Drawings

COLD-CURING, LOW-SOLVENT OR SOLVENT-FREE 2-COMPONENT POLYURETHANE/POLYUREA COMPOSITIONS

This is a continuation of application Ser. No. 08/318,446, filed Oct. 15, 1994, now abandoned.

BACKGROUND OF THE INVENTION

1. Field of the Invention

The present invention relates to light-fast, cold-curing, low-solvent or solvent-free two-component polyurethane/polyurea compositions (PUR/PU compositions) comprising disecondary diamines and (cyclo)aliphatic NCO prepolymers which are useful for coatings, sealing compositions, casting compositions, reaction coating materials and adhesives.

2. Discussion of the Background

Often it is desirable to introduce urea segments into polyurethanes to form polyurethane/polyurea elastomer compositions. Such introduction of urea segments is known to considerably improve the properties of PUR elastomers, especially in the area of tensile strength, tear propagation resistance and abrasion resistance.

When introducing urea segments, a wide variety of amine/isocyanate reaction products have been used with varying degrees of success. However, in the preparation of polyureas, it is not possible nor practical to use the reaction product of (cyclo)aliphatic polyamines with polyisocyanates, since they are known to react so rapidly that they are not capable of being processed.

It is desirable to have a method for introducing urea segments into polyurethane elastomer compositions which will provide a polyurethane/polyurea (PUR/PU) composition having cycloaliphatic structures in the polyurea segments while allowing the composition to be handled conveniently during processing.

SUMMARY OF THE INVENTION

Accordingly, one object of the present invention is to provide suitable (cyclo)aliphatic diamines, which can be processed with polyisocyanates at room temperature to give PUR/PU compositions.

Another object of the present invention is to provide PUR/PU compositions which are solvent free or low solvent and which are light-fast and cold-curing, for use in coatings, sealing compositions, casting compositions, reaction coating materials and/or adhesives.

These and other objects of the present invention have been satisfied by the discovery that in the reaction of diamines with polyisocyanates, the resulting product can be processed readily when the diamines used for reaction with polyisocyanates are those based on (cyclo)aliphatic, sterically hindered disecondary diamines.

The invention therefore relates to reactive, light-fast, 2-component polyurethane/polyurea compositions which cure at room temperature and comprise a reaction product of:

a) a diamine of the general formula

R'—N—R—N—R'
 |       |
 H       H

-continued

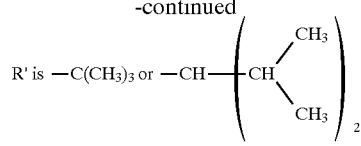

where R is a linear, branched or cyclic alkylene radical having 2–16 carbon atoms which may be optionally substituted by $C_1$–$C_4$ alkyl, wherein in said alkylene radical 1–3 $CH_2$ groups may optionally be replaced by

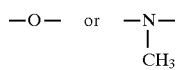

groups; and b) one or more NCO prepolymers prepared from reaction of one or more linear, branched or cyclic aliphatic isocyanates and one or more polyetherpolyols or polyesterpolyols, wherein the NCO prepolymer has an NCO functionality $\geq 2$;

wherein reactants a) and b) are reacted in an NCO:NH equivalent ratio of (1.5–1):1 and the resulting composition having a maximum solvent content of 20% by weight.

Suitable NCO prepolymers for the PUR/PU compositions according to the present invention include reaction products of branched polyetherpolyols or polyesterpolyols or mixtures thereof, and (cyclo)aliphatic diisocyanates, where the OH/NCO equivalent ratio may be 1:(1.5–2). If desired, the polyetherpolyols and polyesterpolyols may contain linear polyetherpolyols or linear polyesterpolyols.

Suitable linear or branched polyetherpolyols are polyalkylenepolyetherpolyols having an average molecular weight of 200–7000, which are obtained by copolymerization, block polymerization or anionic polymerization of alkylene oxides, such as ethylene or propylene oxides, with difunctional and more highly-functional alcohols, such as ethylene glycol, propane-1,3-diol and trimethylolpropane, or with amines, such as ethylenediamine or hexamethylenediamine. The polyetherpolyols may also be prepared by acid catalyzed cationic polymerization and copolymerization of cyclic ethers, such as tetrahydrofuran, ethylene oxide and propylene oxide.

Also suitable for the preparation of the PUR/PU compositions according to the invention are polyhydroxypolyesters, which are reaction products of polyhydric alcohols with polybasic carboxylic acids. In place of the free polycarboxylic acids it is also possible to use the corresponding anhydrides or carboxylic esters of lower ($C_1$–$C_4$) alcohols or mixtures thereof. The polycarboxylic acids may be aliphatic, cycloaliphatic, aromatic or heterocyclic acid or a mixture thereof. Suitable polycarboxylic acid derivatives include succinic, adipic, sebacic, phthalic and isophthalic acid, hexahydro- and tetrahydrophthalic acid, and dimethyl terephthalate.

Examples of suitable polyhydric alcohols for the preparation of the polyhydroxy-polyesters are ethylene glycol, propylene 1,2-glycol and propylene 1,3-glycol, butane-1,4-diol, hexane-1,6-diol, octane-1,8-diol, neopentylglycol, 2,2,4-(2,4,4-)trimethylhexane-1,6-diol, cyclohexane-1,4-dimethanol, 2-methylpentane-1,5-diol, glycerol, trimethylolpropane, trimethylolethane, hexane-1,2,6-triol, diethylene glycol and dibutylene glycol.

Other raw material components which can be used for preparing polyesters include lactones, such as ε-caprolactone, or hydroxycarboxylic acids, such as hydroxy-caproic acid. Appropriate OH components for the NCO prepolymers to be employed in the PUR/PU compositions according to the invention may of course also be polycaprolactones having an OH functionality of $\geq 2$.

In preparing the the NCO prepolymers of the present invention, suitable (cyclo)aliphatic diisocyanates include hexamethylene-1,6-diisocyanate (HDI), 2-methyl-pentamethylene-1,5-diisocyanate, 2,2,4-(2,4,4-)tri-methylhexamethylene 1,6-diisocyanate (TMDI), isophorone diisocyanate (IPDI), methylenebis(4-cyclohexylisocyanate), tetramethyexylylene diisocyanate and 1,4-bis(isocyana-tomethyl)cyclohexane.

The NCO prepolymers of the present invention can be prepared, in bulk or in plasticizers, such as benzylbutyl phthalate, phosphoric esters and chlorinated paraffins, using conventional methods. In one such method, the diisocyanate is heated to 80° C., either neat or intimately admixed with a plasticizer if desired, and the polyol component is metered into the diisocyanate at a rate such that the temperature of the reaction mixture does not exceed 90° C. When the addition of polyol is complete, heating at 80° C. is continued until the OH/NCO reaction has taken place quantitatively. The NCO prepolymers prepared in this way contain— depending on the molecular weight of the OH component— 2–7% of monomeric diisocyanate and possess an NCO content of 2–10%. In some cases it is advantageous to prepare the NCO prepolymer in two stages. In the 1st stage, 5–10 mol of diisocyanate is reacted with 1 mol of polyol at about 80° C., and in the 2nd stage the unreacted diisocyanate is removed from the reaction product by thin film distillation at 150°–180° C./0.1 torr. The NCO prepolymers prepared in this way are distinguished by an extremely low monomer content of $\geq 0.3\%$.

In addition to the NCO prepolymers discussed above, the trimeric forms of the diisocyanates, such as isocyanurates or biurets, which can be prepared by known methods, are also suitable for the preparation of the PUR/PU compositions of the present invention.

The diamines which are suitable for the preparation of the PUR/PU compositions of the present invention contain two secondary, sterically hindered amino groups. Within the context of the present invention, the use of the term secondary, sterically hindered amino group refers to secondary amino groups (those having two organic substituents) wherein one of the organic substituents on each nitrogen is either a tert-butyl group or a di-isopropylmethyl group. These diamines can be prepared by known procedures in two stages. If R' is diisopropylmethyl, the diamine is reacted with diisopropyl ketone in the 1st stage to give the Schiff base, and in the 2nd stage the Schiff base is hydrogenated to give the N,N'-bis[diisopropylmethyl]diamine. If R' is tert-butyl, the Schiff base is generally formed by employing tert-butylamine and a dialdehyde, usually glyoxal.

The diamines which can be employed for reaction with diisopropyl ketone include: ethylenediamine, propylenediamine, butylenediamine, 2,2,4-(2,4,4-)-trimethylhexamethylene-1,6-diamine (TMD), 2-methylpenta-methylene-1,5-diamine, 1,4-diaminocyclohexane, 1,4-bis-(aminomethyl)cyclohexane, isophoronediamine (IPD) methylenebis(4-cyclohexylamine) and 3,3'-dimethyl-4,4'-diaminodicyclohexylmethane. Suitable reaction components for preparation of the tert-butylamines are dialdehydes such as glyoxal, malonaldehyde, succinaldehyde, glutaraldehyde and terephthalaldehyde.

In the preparation of the 2-component PUR/PU compositions according to the invention, the components—the NCO prepolymer and the sterically hindered diamine (DA) —are mixed. In the PUR/PU compositions of the present invention the sterically hindered diamine may be a bis(tert-butyl) substituted diamine, an bis(isopropylmethyl) substituted diamine or even a mixture of bis(tert-butyl)substituted diamine and bis(isopropylmethyl) substituted diamine.

The mixing may be done either neat or, optionally, in inert solvents, such as toluene, xylene and methoxypropyl acetate or in plasticizers, such as dicarboxylic esters, benzylbutyl phthalate, phosphoric esters, for example trioctyl phosphate, tricresyl phosphate, sulphonic esters or chlorinated paraffins. The components are mixed such that the NCO:NH ratio is in the range (1.5–1):1, preferably (1.2–1):1. The resulting reaction product is then applied after a maturation time of about 5 min. In the context of the present invention, the use of the term "low-solvent" indicates that the resulting PUR/ PU compositions have a maximum solvent content of 20% by weight, preferably a maximum of 10% by weight, and most preferably are solvent free (i.e. no measurable amount of solvent present in the resulting composition).

The 2-component PUR/PU compositions according to the invention are suitable for the production of coatings, sealing compositions and casting compositions, and for 2-component coating materials (reaction coating materials) and adhesives. Any auxiliaries or additives which are required for the respective applications, such as fillers, pigments, catalysts or antifoams, can be admixed with the PUR/PU compositions of the present invention, as needed. Suitable substrates for the PUR/PU compositions according to the invention include any desired substrates, such as concrete, metal, wood, glass, ceramic, stone and plastics. Application is carried out using conventional processes, such as knife coating, flow coating, spraying or rolling.

Having generally described this invention, a further understanding can be obtained by reference to certain specific examples which are provided herein for purposes of illustration only and are not intended to be limiting unless otherwise indicated.

EXAMPLES

Experimental Section

A.1 Preparation of amine component A1

A two stage process was used to prepare amine component A1, wherein in the 1st stage ethylenediamine and diisopropyl ketone were heated in a molar ratio of 1:2 in the presence of 1% by weight of an acidic ion exchanger for about 24 h. Subsequently, the aqueous and the organic phases were separated. In order to remove residual water, the organic phase was heated at 100° C. and 0.1 mbar until no further water was evolved.

In the 2nd stage, the resultant Schiff base from stage 1 was hydrogenated over a Co catalyst at 130° C. and 300 bar.

The crude product was distilled at 140° C./0.1 mbar.

The reaction product prepared in this way—1,1,6,6-tetraisopropyl-2,5-diazahexane (A 1)—had a basic amine content of 7.8 mmol of $NH_2$/g.

A.2 Preparation of amine component A2

A2 was prepared using a similar two stage process as that used in the preparation of A1, wherein glyoxal and tert-butylamine were allowed to react in a molar ratio of 1:2 and the resulting Schiff base was subsequently hydrogenated under the reaction conditions indicated for A1.

The reaction mixture prepared in this way had a basic amine content of 11.5 mmol of $NH_2$/g.

B. Preparation of the NCO prepolymers

I. The NCO prepolymers employed for the process according to the invention have generally been prepared by mixing the OH component (a polyether or polyester containing OH groups) with the diisocyanate, usually IPDI, in an OH:NCO equivalents ratio of 1:2, and heating with 0.05% by weight of dibutyl tin dilaurate (DBTL) at 80° C. until the theoretical NCO content of the reaction product was reached.

II. However, in some cases it proved expedient to follow a procedure in which the diisocyanate was reacted with the polyol in an NCO:OH ratio of (10–20):1, and then in a 2nd stage the unreacted excess diisocyanate was removed from the reaction product by thin film distillation.

Example 1

2220 parts by weight of IPDI were heated with 3360 parts by weight of the polyethertriol Voranol CP 3322 and 0.55 part by weight of DBTL at 80° C. for 60 min. During this time, the NCO content fell to 12.6%. The unreacted IPDI was separated off from the reaction product by thin film distillation at 180° C./0–1 torr. The final NCO content of the reaction product was 2.6%.

Example 2

IPDI was reacted in accordance with method I with a polyester which contained OH groups and was made from 1 mol of trimethylolpropanes, 6 mol of hexanediol, 1 mol of adipic acid and 5 mol of phthalic anhydride and had an OH number of 105 mg of KOH/g. The NCO prepolymer thus prepared had an NCO content of 5%.

Example 3

IPDI was reacted in accordance with method I with a polyester which contained OH groups and was made from 2 mol of trimethylolpropane, 6 mol of hexanediol, 3 mol of adipic acid and 3 mol of phthalic anhydride and had an OH number of 195 mg of KOH/g. The NCO prepolymer thus prepared had an NCO content of 7.4%.

Example 4

IPDI was reacted in accordance with method I with a polyester which contained OH groups and was made from 2 mol of trimethylolpropane, 5 mol of hexanediol, 2 mol of adipic acid and 3 mol of phthalic anhydride and had an OH number of 207 mg of KOH/g. The NCO prepolymer thus prepared had an NCO content of 7.8%.

Example 5

IPDI was reacted in accordance with method I with the polyethertriol Voranol CP 3001 (OH number 57 mg of KOH/g). The reaction product had an NCO content of 3.2%.

Example 6

IPDI was reacted in accordance with method I with the polytetrahydrofurandiol Teracol 1000 (molecular weight: approximately 1000). The reaction product had an NCO content of 5.5%.

Example 7

IPDI was reacted in accordance with method I with the polytetrahydrofurandiol Teracol 650 (molecular weight: approximately 650). The reaction product had an NCO content of 7.5%.

Example 8

IPDI was reacted in accordance with method I with the polypropylene glycol Voranol P 1010 (molecular weight: approximately 1000). The reaction product had an NCO content of 5.7%.

C. Production of clearcoats using the PUR/PU compositions according to the invention The amine component A 1 was mixed with the NCO prepolymer in an equivalent NH:NCO molar ratio and, after a maturation time of about 5 min, was applied to degreased steel panels and cured at room temperature for 7 days.

Table 1 below provides the resulting data when the compositions of the above examples were used as clearcoats or varnishes having a layer thickness of approximately 50 μm.

TABLE 1

Curing of 2-component PUR coatings

| | Example composition of the 2-component PUR coating | | Coatings properties (curing at room temperature for 7 days) | | | | | | | |
|---|---|---|---|---|---|---|---|---|---|---|
| Ex. No. | NCO prepolymer | Amine | PL | LT | KH1 | KH3 | KH7 | CH | EI | Imp. rev. |
| 1 | B 2 | A 1 | about 90 | 40–60 | 16 | 23 | 29 | 1 | >10 | >944.6 |
| 2 | B 3 | A 1 | about 45 | 40–55 | 99 | 132 | 140 | 2 | >10 | >944.6 |
| 3 | B 4 | A 1 | about 30 | 50–60 | 72 | 103 | 111 | 1 | >10 | >944.6 |
| 4/com. | B 2 | $H_2N-CH_2-CH_2-NH_2$ | | | gelled immediately | | | | | |
| 5/com. | B 3 | | | | gelled immediately | | | | | |

Abbreviations used:
PL      Pot life in min (100 g batch)
LT      Layer thickness in μm
KH 1,3,7      König hardness in sec (DIN 53 157) after 1, 3, and 7 days, respectively
EI      Erichsen identation in mm (DIN 53 156)
CH      Crosshatch
Imp. rev. Impact reverse in g m As shown in Table 1 above, the compositions of the present invention have superior coating properties when compared to attempts to react the NCO prepolymer with non-sterically hindered diamines. When the diamine used was a linear, non-sterically hindered amine (Ex. 4/com.) or if no diamine was present (Ex. 5/com.), the reaction product gelled immediately and did not provide a suitable clearcoat and would not allow for coating to occur.

D. Production of 2-component PUR thick-layer systems according to the invention

The IPDI prepolymer was homogenized with the equivalent quantities of the sterically hindered amine and, as desired, 0.05–0.1% by weight of antifoam, 0.1–0.3% by weight of oxidation stabilizer, 0.05–0.1% by weight of catalyst and subsequently, as desired, extensively degassed until free of bubbles.

The casting composition was cast in molds and cured at room temperature. The test data given in the following Table 2 were determined after curing the coatings having a thickness of approximately 2 mm at room temperature for 14 days. As shown in Table 2, the compositions of the present invention provide excellent coating characteristics.

TABLE 2

Production of 2-component PUR coatings (2 mm thick test panels)

Composition of the resin/curing agent mixture

| Example No. | NCO prepolymer (1 NCO equiv.) | Sterically hindered amine NH equivalents | Polyol OH equivalents | PL | Shore A | $\sigma_T$ | $\epsilon_B$ | TP |
|---|---|---|---|---|---|---|---|---|
| 1 | B 8 | 0.5 A.1 | Voranol CP 3001 | 50 | 31 | 6.7 | 1041 | 6.8 |
| 2 | B 6 | 0.5 A.1 | 0.5 Voranol CP 3001 | 39 | 35 | 2 | 1235 | 4.8 |
| 3 | B 7 | 0.5 A.1 | 0.5 Voranol CP 3001 | 27 | 62 | 20.5 | 583 | 16 |
| 4 | B 7 | 1 A.1 | - Voranol CP 3001 | 25 | 96 | 29 | 478 | 71.2 |
| 5 | B 5 | 1. A.1 | - Voranol CP 3001 | 120 | 35 | 2.7 | 442 | 3.7 |
| 6 | B 6 | 0.5 A.2 | 0.5 Voranol CP 3001 | 11 | 37 | 2.4 | 1052 | 5.2 |

Abbreviations used:
PL    Pot life in min (100 g batch)
$\sigma_T$    Tear strength N/mm$^2$
$\epsilon_B$    Elongation at break (%) Tensile test DIN 53 504
TP    Tear propagation resistance N/mm DIN 53 507
Shore A    Hardness (sec) DIN 53 505

What is claimed as new and is desired to be secured by Letters Patent of the United States is:

1. A cold-curing 2-component polyurethane/polyurea composition having a solvent content of at most 20% by weight comprising a reaction product consisting essentially of a diamine component (a) and an NCO prepolymer component (b), wherein a) the diamine component is of the following composition

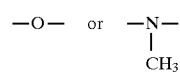

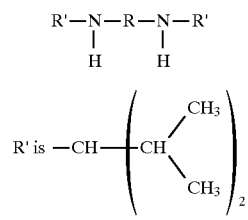

wherein R is a linear, branched or cyclic alkylene radical having 2–16 carbon atoms which may be optionally substituted by $C_1$–$C_4$ alkyl, wherein in said alkylene radical 1–3 $CH_2$ groups may optionally be replaced by —O—   or   —N—
              |
             $CH_3$ b) the NCO prepolymer component is composed of one or more NCO prepolymers prepared from reaction of one or more linear, branched or cyclic aliphatic isocyanates and one or more polyetherpolyol or hydroxyl group containing polyester, wherein the NCO prepolymer has an NCO functionality $\geq 2$;

wherein reactants a) and b) are reacted in an NCO:NH equivalent ratio of (1.5–1):1.

2. A cold-curing 2-component polyurethane/polyurea composition having a solvent content of at most 20% by weight comprising a reaction product consisting essentially of a diamine component (a) and an NCO prepolymer component (b) wherein a) the diamine component is of the following composition

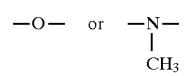

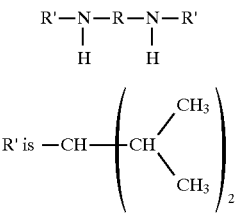

wherein R is a linear, branched or cyclic alkylene radical having 2–16 carbon atoms which may be optionally substituted by $C_1$–$C_4$ alkyl, wherein in said alkylene radical 1–3 $CH_2$ groups may optionally be replaced by —O—   or   —N—
              |
             $CH_3$ b) the NCO prepolymer component is an NCO prepolymer which is a reaction product of isophorone diisocyanate with a polyesterpolyol having an OH functionality >2 and an OH number of 30–200 mg of KOH/g, and wherein isophorone diisocyanate and the polyesterpolyol are reacted in an NCO:OH equivalent ratio of 2:1.

3. A cold-curing 2-component polyurethane/polyurea composition having a solvent content of at most 20% by weight comprising a reaction product consisting essentially of a diamine component (a) and an NCO prepolymer component (b) wherein a) the diamine component is of the following composition

R'—N—R—N—R'
   |        |
   H      H

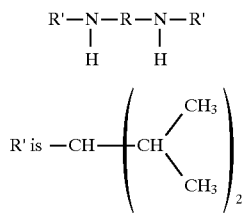

wherein R is a linear, branched or cyclic alkylene radical having 2–16 carbon atoms which may be optionally substituted by $C_1$–$C_4$ alkyl, wherein in said alkylene radical 1–3 $CH_2$ groups may optionally be replaced by

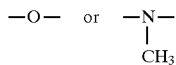

groups: and b) the NCO prepolymer which is a reaction product of isophorone diisocyanate with a polyetherpolyol having an OH functionality ≧2 and an OH number of 30–200 mg of KOH/g, and wherein isophorone diisocyanate and the polyetherpolyol are reacted in an NCO:OH equivalents ratio of 2:1.

4. In a cold-curing 2-component polyurethane/polyurea composition having a solvent content of at most 20% by weight comprising a reaction product consisting essentially of b) an NCO prepolymer component composed of one or more NCO prepolymers prepared from reaction of one or more linear, branched or cyclic aliphatic isocyanates and one or more polyetherpolyol or hydroxyl group containing polyester, wherein the NCO prepolymer has an NCO functionality ≧2, and a) a diamine component, the improvement wherein said diamine component a) is of the following composition a) the diamine component is of the following composition

R'—N—R—N—R'
   |        |
   H      H

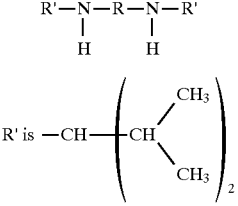

wherein R is a linear, branched or cyclic alkylene radical having 2–16 carbon atoms which may be optionally substituted by $C_1$–$C_4$ alkyl, wherein in said alkylene radical 1–3 $CH_2$ groups may optionally be replaced by

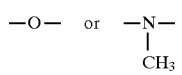

groups; and wherein reactants a) and b) are reacted in an NCO:NH equivalent ratio of (1.5–1):1.

* * * * *